US012614973B2

(12) United States Patent
Ji

(10) Patent No.: US 12,614,973 B2
(45) Date of Patent: Apr. 28, 2026

(54) BIDIRECTIONAL BRIDGELESS PFC CIRCUIT

(71) Applicant: AcLeap Power Inc., Taipei City (TW)

(72) Inventor: Fei Ji, Princeton, NJ (US)

(73) Assignee: AcLeap Power Inc., Taipei City (TW)

( * ) Notice: Subject to any disclaimer, the term of this patent is extended or adjusted under 35 U.S.C. 154(b) by 217 days.

(21) Appl. No.: 18/697,979

(22) PCT Filed: Oct. 8, 2021

(86) PCT No.: PCT/CN2021/122708
§ 371 (c)(1),
(2) Date: Apr. 2, 2024

(87) PCT Pub. No.: WO2023/056613
PCT Pub. Date: Apr. 13, 2023

(65) Prior Publication Data
US 2024/0421703 A1    Dec. 19, 2024

(51) Int. Cl.
*H02M 1/42* (2007.01)
*H02M 7/797* (2006.01)
(52) U.S. Cl.
CPC ......... *H02M 1/4208* (2013.01); *H02M 7/797* (2013.01)
(58) Field of Classification Search
CPC ......... H02M 7/797; H02M 7/81; H02M 7/77; H02M 7/68; H02M 1/42; H02M 1/40;
(Continued)

(56) References Cited

U.S. PATENT DOCUMENTS

| | | | |
|---|---|---|---|
| 10,432,086 B1 | 10/2019 | Kamath | |
| 2009/0230929 A1* | 9/2009 | Sui | H02M 1/4208 |
| | | | 323/207 |

(Continued)

FOREIGN PATENT DOCUMENTS

| | | |
|---|---|---|
| CN | 101151791 A | 3/2008 |
| CN | 102035364 A | 4/2011 |

(Continued)

OTHER PUBLICATIONS

International Search Report and Written Opinion for International Application No. PCT/CN2021/122708, dated Jun. 23, 2022, 6 pages.

*Primary Examiner* — Nguyen Tran
(74) *Attorney, Agent, or Firm* — CKC & Partners Co., LLC

(57) ABSTRACT

In one aspect, a bidirectional bridgeless power factor correction (PFC) circuit includes a main circuit, a current detection circuit, and a controller. The main circuit includes an input inductor and is configured to receive an alternating current (AC) voltage from an AC power supply at a first terminal of the input inductor and convert the AC voltage to a direct current (DC) voltage, where a direction of a current flowing through the input inductor during a positive half of the AC voltage is different from a direction of the current flowing through the input inductor during a negative half of the AC voltage. The current detection circuit is configured to generate a detection signal indicating an amount of the current flowing through the input inductor only during a discharge phase of the input inductor. The controller is configured to generate a zero-crossing signal based on the detection signal.

19 Claims, 5 Drawing Sheets

(58) Field of Classification Search
CPC ............. H02M 1/4208; H02M 1/4216; H02M
1/4225; H02M 1/4233; H02M 1/4241;
H02M 1/425; H02M 1/4258; H02M
1/4266; H02M 1/4275; H02M 1/4283
See application file for complete search history.

(56)                    References Cited

U.S. PATENT DOCUMENTS

2022/0045595 A1*   2/2022   Kobayashi ............ H02M 1/007
2022/0255415 A1*   8/2022   Ishibashi ............. H02M 1/0009

FOREIGN PATENT DOCUMENTS

| CN | 104052298 A | 9/2014 |
|---|---|---|
| CN | 111332143 A | 6/2020 |
| CN | 112003454 A | 11/2020 |
| CN | 112787487 A | 5/2021 |
| CN | 113030554 A | 6/2021 |

* cited by examiner

BIDIRECTIONAL BRIDGELESS PFC CIRCUIT

CROSS-REFERENCE TO RELATED APPLICATIONS

This application is a National Stage Entry of International Patent Application No. PCT/CN2021/122708, filed Oct. 8, 2021, and titled "BIDIRECTIONAL BRIDGELESS PFC CIRCUIT", which is hereby incorporated by reference in its entirety.

BACKGROUND

Embodiments of the present disclosure generally relate to the field of Power Factor Correction (PFC) circuits, and more particularly, to a bidirectional bridgeless PFC circuit.

Nowadays, bidirectional bridgeless PFC circuits are becoming more and more popular due to their smaller power consumption as compared with conventional unidirectional PFC circuits. Zero current detection (ZCD) circuits used in the conventional unidirectional PFC circuits in a critical conduction mode (CRM) are not suitable for the bidirectional bridgeless PFC circuits, because the current can only flow through the ZCD circuits in one direction. If an additional ZCD circuit in which the current can flow through in another direction is added in the unidirectional PFC circuits, the size and cost of the PFC circuits will be increased.

BRIEF DESCRIPTION

In view of the foregoing problems, various example embodiments of the present disclosure provide a bidirectional bridgeless PFC circuit capable of achieving bidirectional current detection without increasing the power consumption and cost of the PFC circuit significantly.

In a first aspect of the present disclosure, example embodiments of the present disclosure provide a bidirectional bridgeless PFC circuit. The bidirectional bridgeless PFC circuit includes a main circuit that includes an input inductor and configured to receive an AC voltage from an AC power supply at a first terminal of the input inductor and convert the AC voltage to a DC voltage, wherein a direction of a current flowing through the input inductor during a positive half of the AC voltage is different from a direction of the current flowing through the input inductor during a negative half of the AC voltage; a current detection circuit electrically coupled to the input inductor and configured to generate a detection signal indicating an amount of the current flowing through the input inductor only during a discharge phase of the input inductor; and a controller electrically coupled to the main circuit and the current detection circuit and configured to generate a zero-crossing signal based on the detection signal. With these embodiments, the direction of the current in the bidirectional PFC circuit can be detected with only one current detection circuit, and the zero-crossing point of the current can be easily determined. Therefore, the power consumption, the size and the control complexity of the PFC circuit can be maintained at a low level.

In some embodiments, the controller is further configured to control an operation of the main circuit based on the zero-crossing signal and control an operation of the current detection circuit based on whether the AC voltage is in the positive half or in the negative half. With these embodiments, the control of the PFC circuit can be achieved in a simple and reliable manner.

In some embodiments, the current detection circuit includes: a current sensing unit electrically coupled to the input inductor and configured to generate a current signal through the electromagnetic coupling between the current sensing unit and the input inductor; a current limiting unit electrically coupled to the current sensing unit and configured to limit the current signal generated by the current sensing unit; a current-to-voltage converting unit electrically coupled to the current limiting unit and configured to convert the current signal to a voltage signal; and a switching unit electrically coupled between the current limiting unit and the current-to-voltage converting unit and configured to deliver the current signal to the current-to-voltage converting unit only during the discharge phase of the input inductor. With these embodiments, the current detection circuit can be achieved with few units, such that the cost of the entire PFC circuit can be reduced.

In some embodiments, the current sensing unit includes a mutual inductor, and a dotted terminal of the mutual inductor corresponds to the first terminal of the input inductor. With these embodiments, the bidirectional current in the inductor can be detected using only one winding in the current detection circuit. In this way, the size and the cost of the PFC circuit can be reduced.

In some embodiments, the current limiting unit includes a first resistor. With these embodiments, the current in the current sensing unit can be limited in a low-cost manner.

In some embodiments, the current-to-voltage converting unit includes a second resistor. With these embodiments, the current signal can be converted in a simple manner.

In some embodiments, the switching unit includes a first bridge arm and a second bridge arm connected in parallel between a first output node and a second output node of the current detection circuit, the first bridge arm includes a first intermediate node, the second bridge arm includes a second intermediate node, and wherein the current limiting unit is coupled between an end of the current sensing unit and the first intermediate node, the other end of the current sensing unit is coupled to the second intermediate node, and the current-to-voltage converting unit is connected between the first output node and the second output node. With these embodiments, the current signal can be delivered to the current-to-voltage converting unit in both the positive half and the negative half of the AC voltage.

In some embodiments, the first bridge arm includes a first diode and a first MOSFET, an anode of the first diode and a drain of the first MOSFET are coupled to the first intermediate node, a cathode of the first diode is coupled to the first output node, and a source of the first MOSFET is coupled to the second output node, wherein the second bridge arm includes a second diode and a second MOSFET, an anode of the second diode and a drain of the second MOSFET are coupled to the second intermediate node, a cathode of the second diode is coupled to the first output node, and a source of the second MOSFET is coupled to the second output node. With these embodiments, the current signal generated in a charge phase of the input inductor cannot be delivered to the current-to-voltage converting unit. Thereby, it can be determined that the zero-crossing of the current in the main circuit is occurring once the voltage signal of the current-to-voltage converting unit reaches zero. Thus, the detection of the zero-crossing point of the current can be achieved in a simple and reliable manner.

In some embodiments, the first bridge arm includes a first MOSFET and a second MOSFET, a drain of the first MOSFET and a source of the second MOSFET are coupled to the first intermediate node, a drain of the second MOS-FET is coupled to the first output node, and a source of the first MOSFET is coupled to the second output node, wherein the second bridge arm includes a first diode and a second diode, a cathode of the first diode and an anode of the second diode are coupled to the second intermediate node, a cathode of the second diode is coupled to the first output node, and an anode of the first diode is coupled to the second output node. With these embodiments, the detection of the zero-crossing point of the current can be achieved in a simple and reliable manner.

In some embodiments, the main circuit further includes a third bridge arm and a fourth bridge arm coupled in parallel between a third output node and a fourth output node of the main circuit, the third bridge arm includes a third intermediate node, and the fourth bridge arm includes a fourth intermediate node, the input inductor is coupled between an end of the AC power supply and the third intermediate node, and the other end of the AC power supply is coupled to the fourth intermediate node, wherein the third bridge arm further includes a first MOSFET and a second MOSFET, a drain of the first MOSFET and a source of the second MOSFET are coupled to the third intermediate node, a drain of the second MOSFET is coupled to the third output node, and a source of the first MOSFET is coupled to the fourth output node, wherein the fourth bridge arm further includes a first diode and a second diode, a cathode of the first diode and an anode of the second diode are coupled to the fourth intermediate node, a cathode of the second diode is coupled to the third output node, and an anode of the first diode is coupled to the fourth output node, and wherein the main circuit further includes a capacitor coupled between the third output node and the fourth output node. With these embodiments, the bidirectional bridgeless PFC circuit can be achieved with fewer components and has lower conduction loss and higher efficiency.

In some embodiments, the main circuit further includes a third bridge arm and a fourth bridge arm coupled in parallel between a third output node and a fourth output node of the main circuit, the third bridge arm includes a third intermediate node, and the fourth bridge arm includes a fourth intermediate node, the input inductor is coupled between an end of the AC power supply and the third intermediate node, and the other end of the AC power supply is coupled to the fourth intermediate node, wherein the third bridge arm further includes a first diode and a second diode, a cathode of the first diode and an anode of the second diode are coupled to the third intermediate node, a cathode of the second diode is coupled to the third output node, and an anode of the first diode is coupled to the fourth output node, wherein the fourth bridge arm further includes a third diode and a fourth diode, a cathode of the third diode and an anode of the fourth diode are coupled to the fourth intermediate node, a cathode of the fourth diode is coupled to the third output node, and an anode of the third diode is coupled to the fourth output node, wherein the main circuit further includes a first MOSFET and a second MOSFET series coupled between the third intermediate node and the fourth intermediate node, a drain of the first MOSFET is coupled to the third intermediate node, a drain of the second MOSFET is coupled to the fourth intermediate node, and a source of the first MOSFET is coupled to the second MOSEFT, and wherein the main circuit further includes a capacitor coupled between the third output node and the fourth output node. With these embodiments, the common mode EMI interference in the PFC circuit can be reduced.

It is to be understood that this brief description is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in examples and in a non-limiting manner, wherein.

Throughout the drawings, the same or similar reference symbols are used to indicate the same or similar elements.

DETAILED DESCRIPTION

Figure 1:
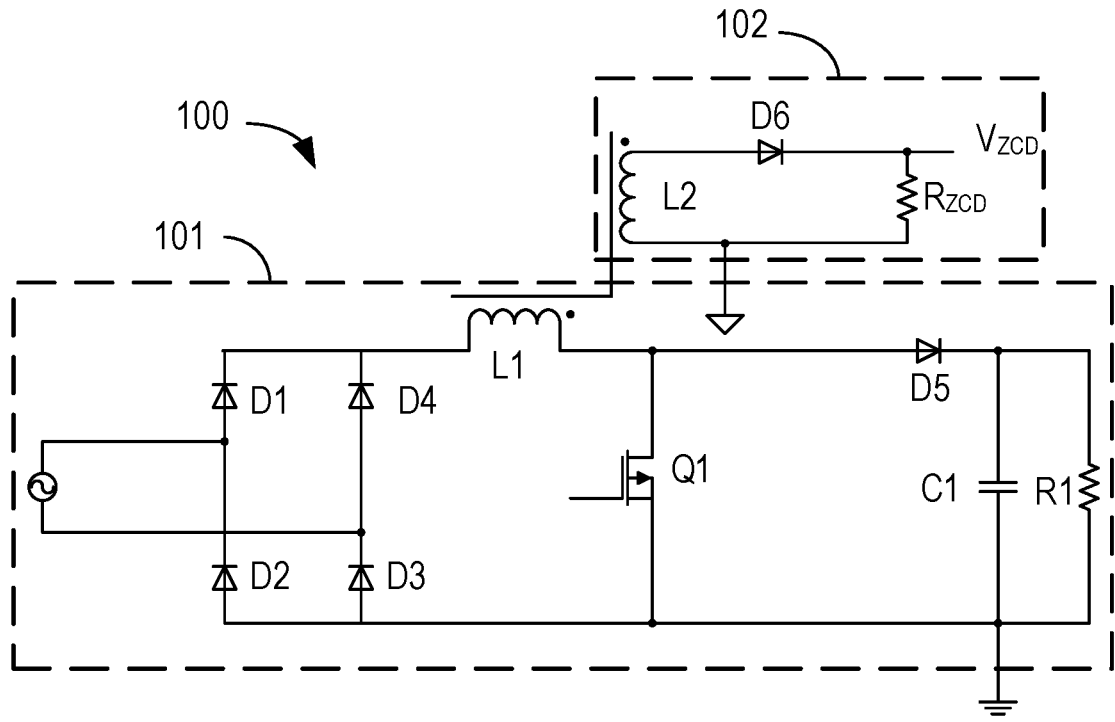
FIG. 1 is a schematic circuit diagram of a conventional unidirectional PFC circuit.

Principles of the present disclosure will now be described with reference to several example embodiments shown in the drawings. Though example embodiments of the present disclosure are illustrated in the drawings, it is to be understood that the embodiments are described only to facilitate those skilled in the art to better understand and thereby implement the present disclosure, rather than to limit the scope of the disclosure in any manner.

The term "comprises" or "includes" and its variants are to be read as open terms that mean "includes but is not limited to." The term "or" is to be read as "and/or" unless the context clearly indicates otherwise. The term "based on" is to be read as "based at least in part on." The term "being operable to" is to mean a function, an action, a motion or a state that can be achieved by an operation induced by a user or an external mechanism. The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below. A definition of a term is consistent throughout the description unless the context clearly indicates otherwise.

First of all, operational principles of ZCD circuits used in conventional PFC circuits will be described with reference to FIGS. 1 and 2.

Refers to FIG. 1 first, FIG. 1 is a schematic circuit diagram of a conventional unidirectional PFC circuit 100. As shown in FIG. 1, the unidirectional PFC circuit 100 includes a main circuit 101 and a ZCD circuit 102. The main circuit 101 includes a rectifier circuit composed of four diodes D1, D2, D3 and D4, and a boost circuit composed of an inductor L1, a MOSFET Q1, a diode D5, and a capacitor C1. The ZCD circuit 102 includes a winding L2 electro-magnetically coupled to the inductor L1, a diode D6 and a resistor $R_{ZCD}$.

When the MOSFET Q1 is turned on, the inductor L1 is charged by the rectified voltage of the rectifier circuit. At this time, the voltage on the left end of the inductor L1 is higher than the voltage on the right end of the inductor L1. As a result, the voltage on the dotted terminal of the winding L2 is lower than that on the other terminal of the winding L2. Therefore, the diode D6 is reversed, and there is no current flowing through the resistor $R_{ZCD}$.

When the MOSFET Q1 is turned off, the power on the inductor L1 is discharged to a load R1. At this time, the voltage on the left end of the inductor L1 is lower than the voltage on the right end of the inductor L1. As a result, the voltage on the dotted terminal of the winding L2 is higher than that on the other terminal of the winding L2. Therefore, the diode D6 is conducted, and a current flows through the resistor $R_{ZCD}$. Accordingly, the ZCD circuit 102 generates a voltage $V_{ZCD}$ indicating an amount of the current in the inductor L1. When the voltage $V_{ZCD}$ reaches zero, it means that a zero-crossing of the current occurs in the inductor L1. In this way, the zero-crossing of the current is detected by the ZCD circuit 102.

The power consumption of the conventional unidirectional PFC circuit is relatively high. Moreover, the conventional ZCD circuit used in the unidirectional PFC circuit, such as the ZCD circuit 102, is no longer suitable for bidirectional bridgeless PFC circuits, because the current in an input inductor of the bidirectional bridgeless PFC circuits is bidirectional, and the conventional ZCD circuit can only detect a current in one single direction.

Figure 2:
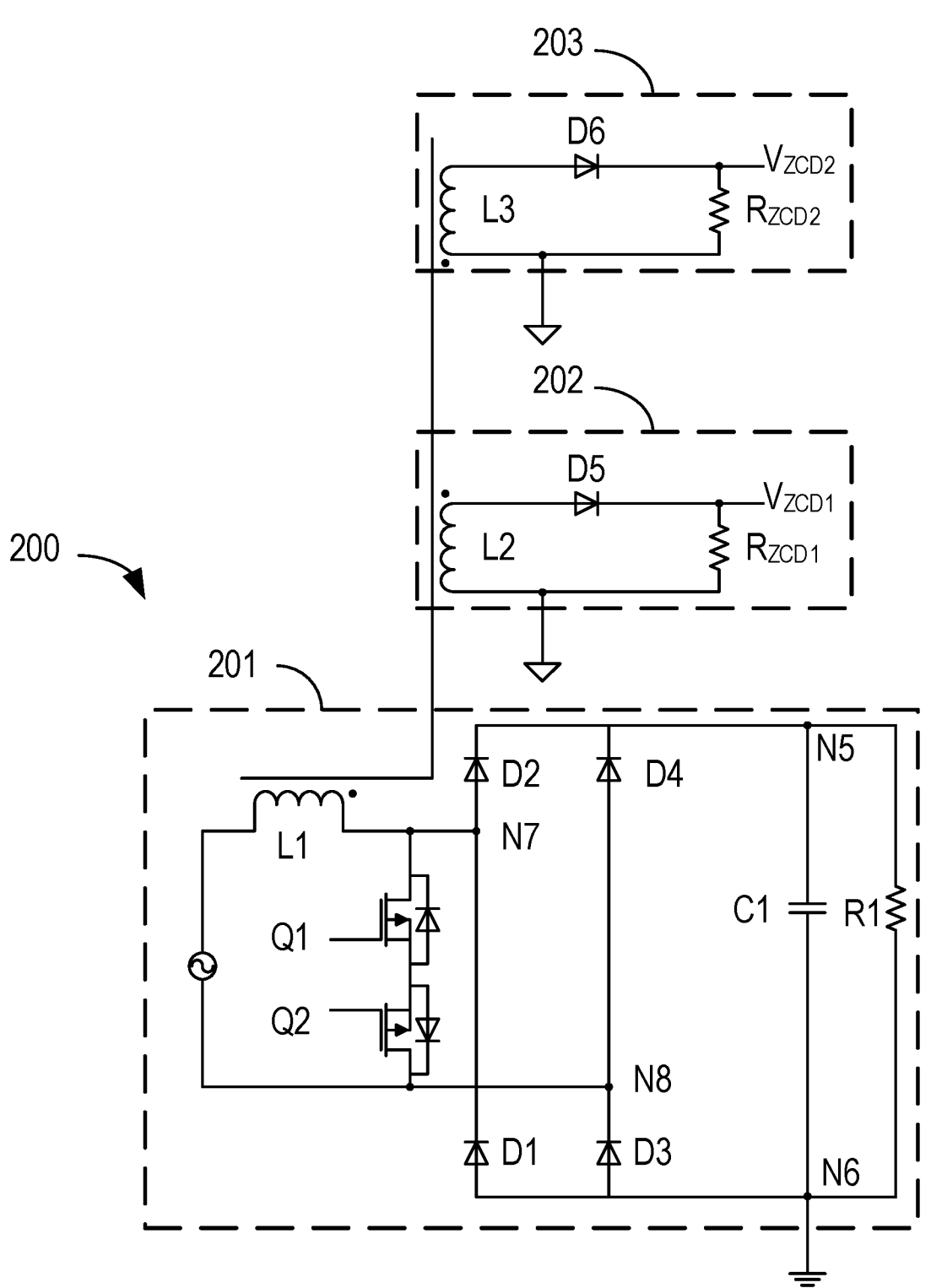
FIG. 2 is a schematic circuit diagram of a conventional bidirectional bridgeless PFC circuit.

FIG. 2 is a schematic circuit diagram of a conventional bidirectional bridgeless PFC circuit. As shown in FIG. 2, the bidirectional bridgeless PFC circuit 200 includes a main circuit 201 and two conventional ZCD circuits 202 and 203. The ZCD circuits 202 and 203 may detect the current in the inductor L1 in a positive half of the AC voltage and a negative half of the AC voltage respectively.

During the positive half, the ZCD circuit 202 is enabled, and the ZCD circuit 203 is disabled. The zero-crossing of the current in the inductor L1 is detected by the ZCD circuit 202. During the negative half, the ZCD circuit 202 is disabled, and the ZCD circuit 203 is enabled. The zero-crossing of the current in the inductor L1 is detected by the ZCD circuit 203.

The additional ZCD circuit needs an additional winding, which will increase the cost and size of the PFC circuit. Moreover, the control complexity of the PFC circuit will be increased.

Other conventional ZCD circuits may include a rectifier bridge to detect the bidirectional current. However, the rectifier bridge output signals "high" and "low" both in the charge phase and discharge phase of the input inductor of the bidirectional PFC circuit, and it is hard to distinguish which one represents the zero-crossing point of the current.

Thus, there is a need to detect the zero-crossing of the current in the bidirectional bridgeless PFC circuit without increasing the size, the power consumption and the control complexity of the PFC circuit significantly.

Figure 3:
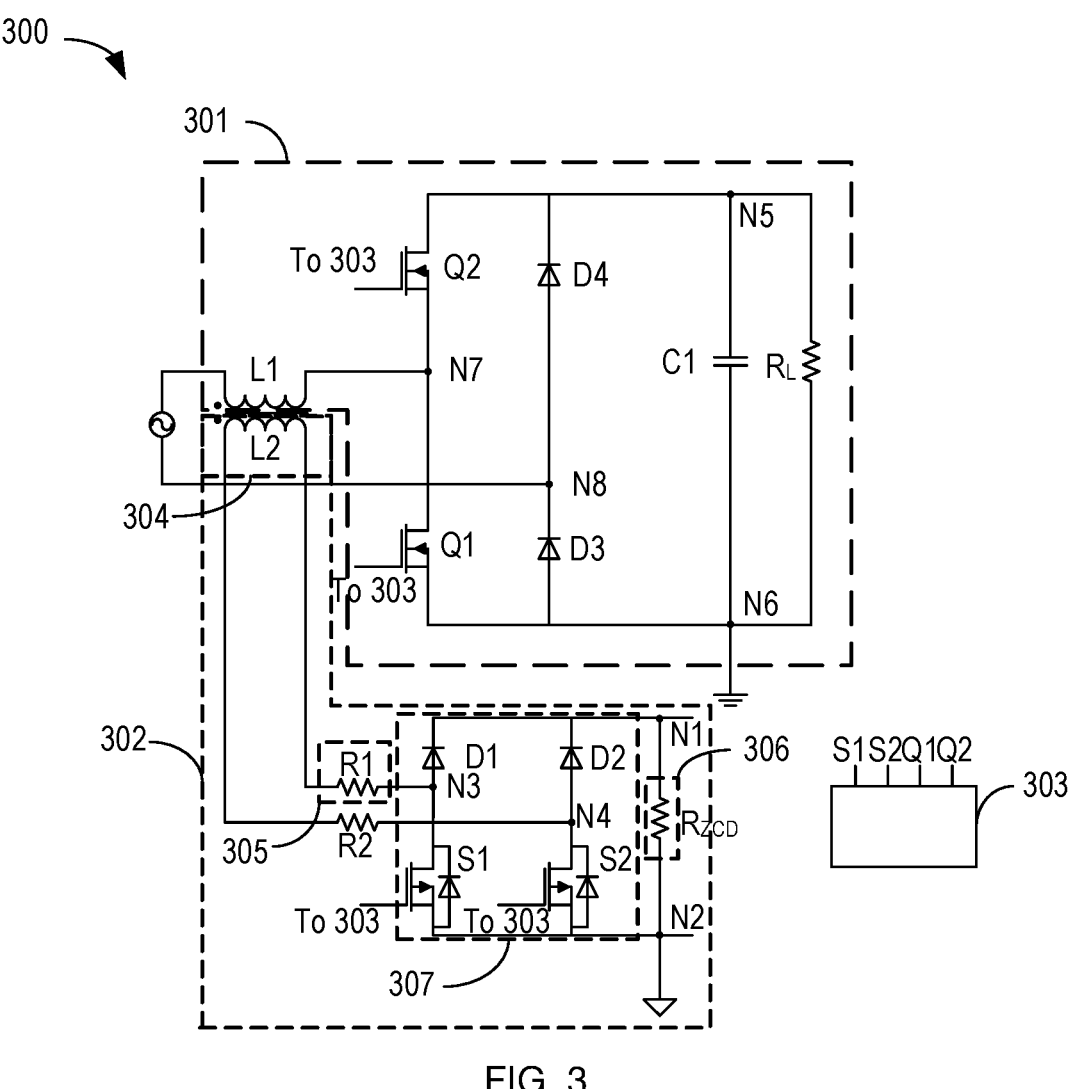
FIG. 3 is a schematic circuit diagram of a bidirectional bridgeless PFC circuit in accordance with an embodiment of the present disclosure.

Hereinafter, the structure of a bidirectional bridgeless PFC circuit in accordance with embodiments of the present disclosure will be described in detail with reference to FIGS. 3 and 4. FIG. 3 is a schematic circuit diagram of a bidirectional bridgeless PFC circuit in accordance with an embodiment of the present disclosure.

As shown in FIG. 3, the bidirectional bridgeless PFC circuit 300 includes a main circuit 301, a current detection circuit 302 and a controller 303. The main circuit 301 includes an input inductor L1 and configured to receive an AC voltage from an AC power supply at a first terminal of the input inductor L1 and convert the AC voltage to a DC voltage. A direction of a current flowing through the input inductor L1 during a positive half of the AC voltage is different from a direction of the current flowing through the input inductor L1 during a negative half of the AC voltage. The current detection circuit 302 is electrically coupled to the input inductor L1 and configured to generate a detection signal indicating an amount of the current flowing through the input inductor L1 only during a discharge phase of the input inductor L1. The controller 303 is electrically coupled to the main circuit 301 and the current detection circuit 302 and configured to generate a zero-crossing signal based on the detection signal.

As shown in FIG. 3, the current detection circuit 302 includes a current sensing unit 304, a current limiting unit 305, a current-to-voltage converting unit 306 and a switching unit 307. The current sensing unit 304 is electrically coupled to the input inductor L1 and configured to generate a current signal through the electromagnetic coupling between the current sensing unit 304 and the input inductor L1. The current limiting unit 305 is electrically coupled to the current sensing unit 304 and configured to limit the current signal generated by the current sensing unit 304 to prevent occurring of a short circuit. The current-to-voltage converting unit 306 is electrically coupled to the current limiting unit 305 and configured to convert the current signal to a voltage signal. The switching unit 307 is electrically coupled between the current limiting unit 305 and the current-to-voltage converting unit 306 and configured to deliver the current signal to the current-to-voltage converting unit 306 only during the discharge phase of the input inductor.

In the embodiment as shown in FIG. 3, in order to reduce the influence of the current detection circuit 302 on the main circuit 301, the current sensing unit 304 includes a mutual inductor L2. A dotted terminal of the mutual inductor L2 corresponds to the first terminal of the input inductor L1. In other embodiments, the current sensing unit 304 can include other elements. The scope of the present disclosure is not intended to be limited in this respect.

In the embodiment as shown in FIG. 3, in order to prevent the occurring of the short circuit, the current limiting unit 305 includes a first resistor R1. In other embodiments, the current limiting unit 305 can include more than one resistor or other elements. The scope of the present disclosure is not intended to be limited in this respect.

In the embodiment as shown in FIG. 3, in order to convert the current signal into a voltage signal in a simple manner, the current-to-voltage converting unit 306 includes a second resistor $R_{ZCD}$. In other embodiments, the current-to-voltage converting unit 306 can include other elements. The scope of the present disclosure is not intended to be limited in this respect.

In the embodiment as shown in FIG. 3, the switching unit 307 includes a first bridge arm and a second bridge arm connected in parallel between a first output node N1 and a second output node N2 of the current detection circuit 302. The first bridge arm includes a first intermediate node N3, and the second bridge arm includes a second intermediate node N4. The first resistor R1 is coupled between an end of the mutual inductor L2 and the first intermediate node N3, the other end of the mutual inductor L2 is coupled to the second intermediate node N4, and the second resistor $R_{ZCD}$ is connected between the first output node N1 and the second output node N2.

In the embodiment as shown in FIG. 3, the first bridge arm includes a first diode D1 and a first MOSFET Si. An anode of the first diode D1 and a drain of the first MOSFET Si are coupled to the first intermediate node N3. A cathode of the first diode D1 is coupled to the first output node N1. A source of the first MOSFET S1 is coupled to the second output node N2. The second bridge arm includes a second diode D2 and a second MOSFET S2. An anode of the second diode D2 and a drain of the second MOSFET S2 are coupled to the second intermediate node N4. A cathode of the second diode D2 is coupled to the first output node Ni. A source of the second MOSFET S2 is coupled to the second output node N2.

Figure 4:
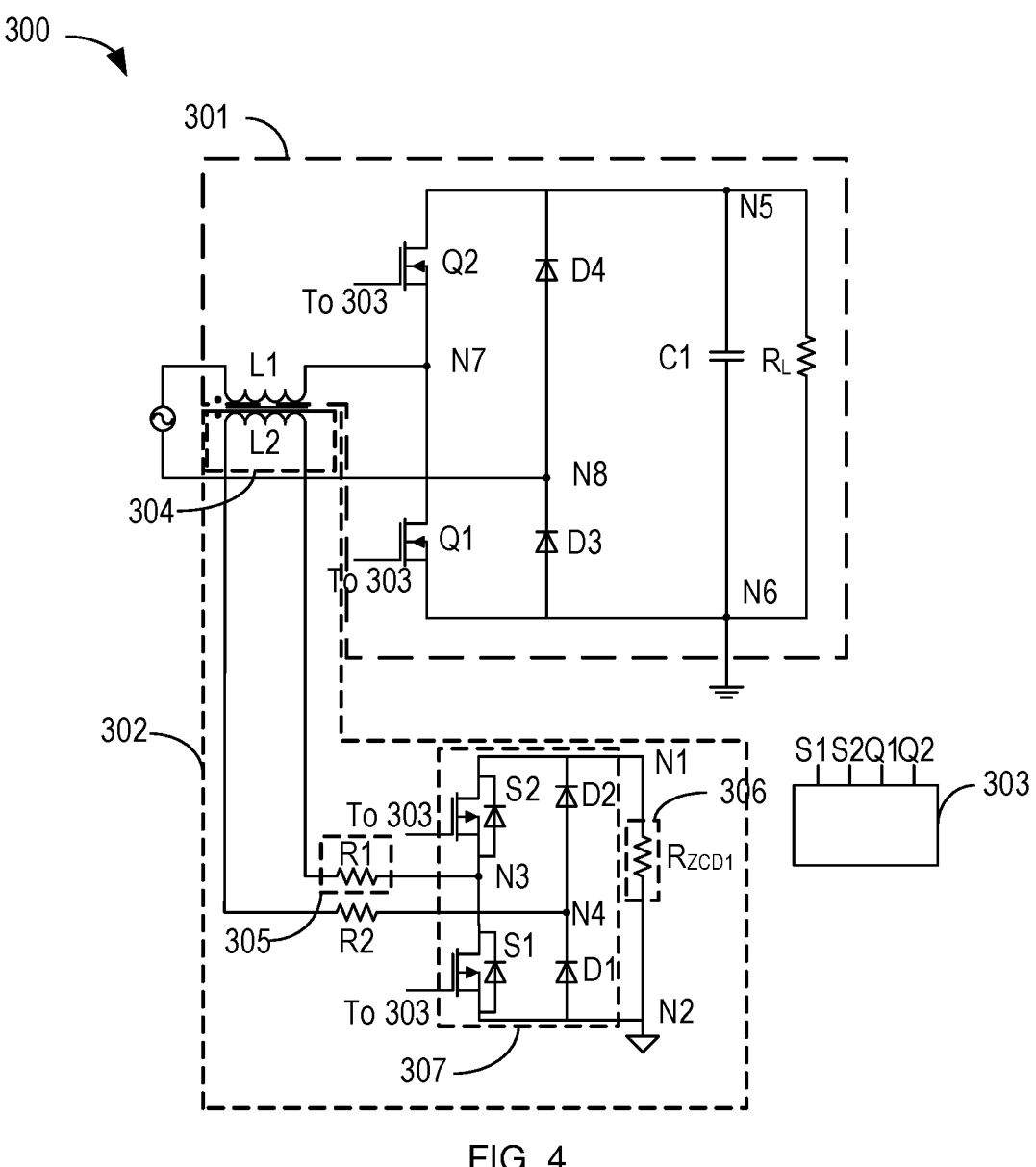
FIG. 4 is a schematic circuit diagram of a bidirectional bridgeless PFC circuit in accordance with another embodiment of the present disclosure.

FIG. 4 is a schematic circuit diagram of a bidirectional bridgeless PFC circuit in accordance with another embodiment of the present disclosure. The only difference between embodiments as shown in FIGS. 3 and 4 is the structure of the switching unit 307. In the embodiment as shown in FIG. 4, the first bridge arm includes a first MOSFET S1 and a second MOSFET S2. A drain of the first MOSFET S1 and a source of the second MOSFET S2 are coupled to the first intermediate node N3. A drain of the second MOSFET S2 is coupled to the first output node N1. A source of the first MOSFET S1 is coupled to the second output node N2. The second bridge arm includes a first diode D1 and a second diode D2. A cathode of the first diode D1 and an anode of the second diode D2 are coupled to the second intermediate node N4. A cathode of the second diode D2 is coupled to the first output node N1. An anode of the first diode D1 is coupled to the second output node N2.

As shown in FIGS. 3 and 4, the main circuit 301 further includes a third bridge arm and a fourth bridge arm coupled in parallel between a third output node N5 and a fourth output node N6 of the main circuit 301. The third bridge arm includes a third intermediate node N7, and the fourth bridge arm includes a fourth intermediate node N8. The input inductor L1 is coupled between an end of the AC power supply and the third intermediate node N7, and the other end of the AC power supply is coupled to the fourth intermediate node N8.

The third bridge arm further includes a first MOSFET Q1 and a second MOSFET Q2. A drain of the first MOSFET Q1 and a source of the second MOSFET Q2 are coupled to the third intermediate node N7. A drain of the second MOSFET Q2 is coupled to the third output node N5, and a source of the first MOSFET Q1 is coupled to the fourth output node N6.

The fourth bridge arm further includes a first diode D3 and a second diode D4. A cathode of the first diode D3 and an anode of the second diode D4 are coupled to the fourth intermediate node N8. A cathode of the second diode D4 is coupled to the third output node N5, and an anode of the first diode D3 is coupled to the fourth output node N6. The main circuit further includes a capacitor C1 coupled between the third output node N5 and the fourth output node N6.

In other embodiments, the main circuit 301 can be of other structures. For example, the main circuit 301 may have the same structure as main circuit 201 as shown in FIG. 2. As shown in FIG. 2, the main circuit 201 further includes a third bridge arm and a fourth bridge arm coupled in parallel between a third output node N5 and a fourth output node N6 of the main circuit 201.

As shown in FIG. 2, the third bridge arm includes a third intermediate node N7, and the fourth bridge arm includes a fourth intermediate node N8. The input inductor L1 is coupled between an end of the AC power supply and the third intermediate node N7, and the other end of the AC power supply is coupled to the fourth intermediate node N8. The third bridge arm further includes a first diode D1 and a second diode D2. A cathode of the first diode D1 and an anode of the second diode D2 are coupled to the third intermediate node N7. A cathode of the second diode D2 is coupled to the third output node N5, and an anode of the first diode D1 is coupled to the fourth output node N6.

As shown in FIG. 2, the fourth bridge arm further includes a third diode D3 and a fourth diode D4. A cathode of the third diode D3 and an anode of the fourth diode D4 are coupled to the fourth intermediate node N8. A cathode of the fourth diode D4 is coupled to the third output node N5, and an anode of the third diode D3 is coupled to the fourth output node N6.

As shown in FIG. 2, the main circuit 201 further includes a first MOSFET Q1 and a second MOSFET Q2 series coupled between the third intermediate node N7 and the fourth intermediate node N8. A drain of the first MOSFET Q1 is coupled to the third intermediate node N7. A drain of the second MOSFET Q2 is coupled to the fourth intermediate node N8. A source of the first MOSFET Q1 is coupled to the second MOSEFT Q2. The main circuit 201 further includes a capacitor C1 coupled between the third output node N5 and the fourth output node N6.

In some embodiments, the controller 303 is further configured to control an operation of the main circuit 301 based on the zero-crossing signal and control an operation of the current detection circuit 302 based on whether the AC voltage is in the positive half or in the negative half, which will be discussed as below.

Figure 5:
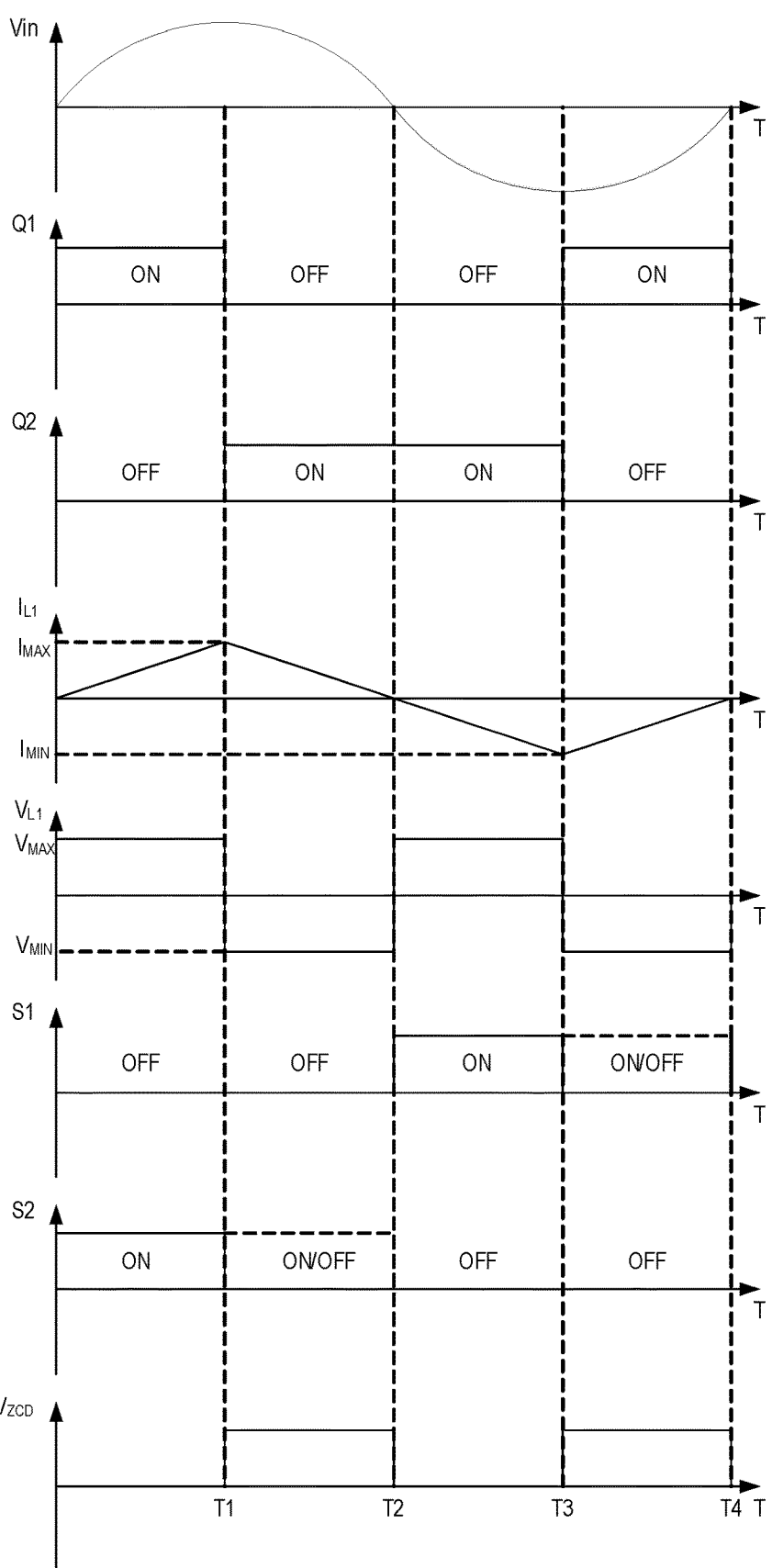
FIG. 5 is a timing diagram illustrating a procedure of sensing the current in the main circuit.

Hereinafter, the operation principle of the bidirectional bridgeless PFC circuit in accordance with embodiments of the present disclosure will be described in detail with reference to FIG. 3 and FIG. 5. FIG. 5 is a timing diagram illustrating a procedure of sensing the current in the main circuit.

As shown in FIG. 5, in the positive half of the AC voltage (0-T2), during the period 0-T1, Q1 is turned on, Q2 is turned off, S1 is turned off, and S2 is turned on under control of the controller 303. The inductor L1 is charged by the AC power supply through the following path: AC power supply—L1-Q1-D3-AC power supply. At this time, the voltage on the left end of the inductor L1 is higher than the voltage on the right end of the inductor L1. As a result, the voltage on the dotted terminal of the mutual inductor L2 is higher than the other terminal of the mutual inductor L2, and the current flows in the current detection circuit 302 through the following path: L2-S2-body diode of Si-R1-L2. Therefore, there is no signal at the first output node Ni.

During the period T1-T2, Q1 is turned off, Q2 is turned on, S1 is turned off, and S2 is turned on or turned off under control of the controller 303. The inductor L1 is discharged to a capacitor C1 through the following path: L1-Q2-C1-D3-AC power supply-L1. At this time, the voltage on the left end of the inductor L1 is lower than the voltage on the right end of the inductor L1. As a result, the voltage on the dotted terminal of the mutual inductor L2 is lower than the other terminal of the mutual inductor L2, and the current flows in the current detection circuit 302 through the following path: L2-R1-D1-$R_{ZCD}$-S2 or body diode of S2-L2. Therefore, there is a voltage signal at the first output node N1 indicating the amount of the current in the inductor L1, and the zero-crossing point of the current in the inductor L1 can be detected by the current detection circuit 302.

In the negative half of the AC voltage (T2-T4), during the period T2-T3, Q1 is turned off, Q2 is turned on, Si is turned on, and S2 is turned off under control of the controller 303. The inductor L1 is charged by the AC power supply through the following path: AC power supply-D4-Q2-L1-AC power supply. At this time, the voltage on the left end of the inductor L1 is lower than the voltage on the right end of the inductor L2. As a result, the voltage on the dotted terminal of the mutual inductor L2 is lower than the other terminal of the mutual inductor L2, and the current flows in the current detection circuit 302 through the following path: L2-R1-S1-body diode of S2-L2. Therefore, there is no signal at the first output node Ni.

During the period T3-T4, Q1 is turned on, Q2 is turned off, S1 is turned on or turned off, and S2 is turned off under control of the controller 303. The inductor L1 is discharged to a capacitor C1 through the following path: L1-AC power supply-D4-C1-Q1-L1. At this time, the voltage on the left end of the inductor L1 is higher than the voltage on the right end of the inductor L2. As a result, the voltage on the dotted terminal of the mutual inductor L2 is higher than the other terminal of the mutual inductor L2, and the current flows in the current detection circuit 302 through a path of: L2-D2-$R_{ZCD}$-Si or body diode of Si-R1-L2. Therefore, there is a voltage signal at the first output node N1 indicating the amount of the current in the inductor L1, and the zero-crossing point of the current in the inductor L1 can be detected by the current detection circuit 302.

The operation principle of the bidirectional bridgeless PFC circuit 300 as shown in FIG. 4 is similar to that of the bidirectional bridgeless PFC circuit 300 as shown in FIG. 3.

Through the current detection circuit 302, the zero-crossing point of the current in the inductor L1 either in the positive half or in the negative half of the AC voltage can be detected while using only one winding, and the output signal of the current detection circuit 302 can be used to determine whether a zero-crossing of the current occurs directly. There is no need to determine whether the inductor is in a charge phase or in a discharge phase. Thus, the zero-crossing of the current in the bidirectional bridgeless PFC circuit is detected while not significantly increase the size, the power consumption or the control complexity of the PFC circuit.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, mate-rials, kits, and/or methods, if such features, systems, articles, materials, kits, and/or methods are not mutually inconsistent, is included within the inventive scope of the present disclosure.

What is claimed is:

1. A bidirectional bridgeless power factor correcting (PFC) circuit comprising:
   a main circuit comprising an input inductor and configured to receive an alternating current (AC) voltage from an AC power supply at a first terminal of the input inductor and convert the AC voltage to a direct current (DC) voltage, wherein a direction of a current flowing through the input inductor during a positive half of the AC voltage is different from a direction of the current flowing through the input inductor during a negative half of the AC voltage;
   a current detection circuit electrically coupled to the input inductor and configured to generate a detection signal indicating an amount of the current flowing through the input inductor only during a discharge phase of the input inductor; and
   a controller electrically coupled to the main circuit and the current detection circuit and configured to generate a zero-crossing signal based on the detection signal.

2. The bidirectional bridgeless PFC circuit according to claim 1, wherein the controller is further configured to control an operation of the main circuit based on the zero-crossing signal and control an operation of the current detection circuit based on whether the AC voltage is in the positive half or in the negative half.

3. The bidirectional bridgeless PFC circuit according to claim 1, wherein the current detection circuit comprises:
   a current sensing circuit electrically coupled to the input inductor and configured to generate a current signal through electromagnetic coupling between the current sensing circuit and the input inductor;
   a current limiting circuit electrically coupled to the current sensing circuit and configured to limit the current signal generated by the current sensing circuit;
   a current-to-voltage converting circuit electrically coupled to the current limiting circuit and configured to convert the current signal to a voltage signal; and
   a switching circuit electrically coupled between the current limiting circuit and the current-to-voltage converting circuit and configured to deliver the current signal to the current-to-voltage converting circuit only during the discharge phase of the input inductor.

4. The bidirectional bridgeless PFC circuit according to claim 3, wherein the current sensing circuit comprises a mutual inductor, and a dotted terminal of the mutual inductor corresponds to the first terminal of the input inductor.

5. The bidirectional bridgeless PFC circuit according to claim 3, wherein the current limiting circuit comprises a first resistor.

6. The bidirectional bridgeless PFC circuit according to claim 3, wherein the current-to-voltage converting circuit comprises a second resistor.

7. The bidirectional bridgeless PFC circuit according to claim 3, wherein the switching circuit comprises a first bridge arm and a second bridge arm connected in parallel between a first output node and a second output node of the current detection circuit, the first bridge arm comprises a first intermediate node, the second bridge arm comprises a second intermediate node, and
   wherein the current limiting circuit is coupled between an end of the current sensing circuit and the first intermediate node, the other end of the current sensing circuit is coupled to the second intermediate node, and the current-to-voltage converting circuit is connected between the first output node and the second output node.

8. The bidirectional bridgeless PFC circuit according to claim 7,
    wherein the first bridge arm comprises a first diode and a first metal-oxide-semiconductor field-effect transistor (MOSFET), an anode of the first diode and a drain of the first MOSFET are coupled to the first intermediate node, a cathode of the first diode is coupled to the first output node, and a source of the first MOSFET is coupled to the second output node,
    wherein the second bridge arm comprises a second diode and a second MOSFET, an anode of the second diode and a drain of the second MOSFET are coupled to the second intermediate node, a cathode of the second diode is coupled to the first output node, and a source of the second MOSFET is coupled to the second output node.

9. The bidirectional bridgeless PFC circuit according to claim 7,
    wherein the first bridge arm comprises a first metal-oxide-semiconductor field-effect transistor (MOSFET) and a second MOSFET, a drain of the first MOSFET and a source of the second MOSFET are coupled to the first intermediate node, a drain of the second MOSFET is coupled to the first output node, and a source of the first MOSFET is coupled to the second output node,
    wherein the second bridge arm comprises a first diode and a second diode, a cathode of the first diode and an anode of the second diode are coupled to the second intermediate node, a cathode of the second diode is coupled to the first output node, and an anode of the first diode is coupled to the second output node.

10. The bidirectional bridgeless PFC circuit according to claim 1, wherein the main circuit further comprises a third bridge arm and a fourth bridge arm coupled in parallel between a third output node and a fourth output node of the main circuit, the third bridge arm comprises a third intermediate node, and the fourth bridge arm comprises a fourth intermediate node, the input inductor is coupled between an end of the AC power supply and the third intermediate node, and the other end of the AC power supply is coupled to the fourth intermediate node,
    wherein the third bridge arm further comprises a first metal-oxide-semiconductor field-effect transistor (MOSFET) and a second MOSFET, a drain of the first MOSFET and a source of the second MOSFET are coupled to the third intermediate node, a drain of the second MOSFET is coupled to the third output node, and a source of the first MOSFET is coupled to the fourth output node,
    wherein the fourth bridge arm further comprises a first diode and a second diode, a cathode of the first diode and an anode of the second diode are coupled to the fourth intermediate node, a cathode of the second diode is coupled to the third output node, and an anode of the first diode is coupled to the fourth output node, and
    wherein the main circuit further comprises a capacitor coupled between the third output node and the fourth output node.

11. The bidirectional bridgeless PFC circuit according to claim 1, wherein the main circuit further comprises a third bridge arm and a fourth bridge arm coupled in parallel between a third output node and a fourth output node of the main circuit, the third bridge arm comprises a third intermediate node, and the fourth bridge arm comprises a fourth intermediate node, the input inductor is coupled between an end of the AC power supply and the third intermediate node, and the other end of the AC power supply is coupled to the fourth intermediate node,
    wherein the third bridge arm further comprises a first diode and a second diode, a cathode of the first diode and an anode of the second diode are coupled to the third intermediate node, a cathode of the second diode is coupled to the third output node, and an anode of the first diode is coupled to the fourth output node,
    wherein the fourth bridge arm further comprises a third diode and a fourth diode, a cathode of the third diode and an anode of the fourth diode are coupled to the fourth intermediate node, a cathode of the fourth diode is coupled to the third output node, and an anode of the third diode is coupled to the fourth output node,
    wherein the main circuit further comprises a first metal-oxide-semiconductor field-effect transistor (MOSFET) and a second MOSFET series coupled between the third intermediate node and the fourth intermediate node, a drain of the first MOSFET is coupled to the third intermediate node, a drain of the second MOS-FET is coupled to the fourth intermediate node, and a source of the first MOSFET is coupled to the second MOSFET, and
    wherein the main circuit further comprises a capacitor coupled between the third output node and the fourth output node.

12. The bidirectional bridgeless PFC circuit according to claim 1, wherein the main circuit further comprises a third bridge arm and a fourth bridge arm coupled in parallel between a third output node and a fourth output node of the main circuit, the third bridge arm comprises a third intermediate node, and the fourth bridge arm comprises a fourth intermediate node, the input inductor is coupled between an end of the AC power supply and the third intermediate node, and the other end of the AC power supply is coupled to the fourth intermediate node.

13. The bidirectional bridgeless PFC circuit according to claim 12, wherein the third bridge arm further comprises a first metal-oxide-semiconductor field-effect transistor (MOSFET) and a second MOSFET, a drain of the first MOSFET and a source of the second MOSFET are coupled to the third intermediate node, a drain of the second MOS-FET is coupled to the third output node, and a source of the first MOSFET is coupled to the fourth output node.

14. The bidirectional bridgeless PFC circuit according to claim 12, wherein the fourth bridge arm further comprises a first diode and a second diode, a cathode of the first diode and an anode of the second diode are coupled to the fourth intermediate node, a cathode of the second diode is coupled to the third output node, and an anode of the first diode is coupled to the fourth output node.

15. The bidirectional bridgeless PFC circuit according to claim 12, wherein the main circuit further comprises a capacitor coupled between the third output node and the fourth output node.

16. The bidirectional bridgeless PFC circuit according to claim 12, wherein the third bridge arm further comprises a first diode and a second diode, a cathode of the first diode and an anode of the second diode are coupled to the third intermediate node, a cathode of the second diode is coupled to the third output node, and an anode of the first diode is coupled to the fourth output node.

17. The bidirectional bridgeless PFC circuit according to claim 16, wherein the fourth bridge arm further comprises a third diode and a fourth diode, a cathode of the third diode and an anode of the fourth diode are coupled to the fourth intermediate node, a cathode of the fourth diode is coupled to the third output node, and an anode of the third diode is coupled to the fourth output node.

18. The bidirectional bridgeless PFC circuit according to claim 12, wherein the main circuit further comprises a first metal-oxide-semiconductor field-effect transistor (MOSFET) and a second MOSFET series coupled between the third intermediate node and the fourth intermediate node, a drain of the first MOSFET is coupled to the third intermediate node, a drain of the second MOSFET is coupled to the fourth intermediate node, and a source of the first MOSFET is coupled to the second MOSFET.

19. The bidirectional bridgeless PFC circuit according to claim 18, wherein the main circuit further comprises a capacitor coupled between the third output node and the fourth output node.

* * * * *